3,385,834
HOMOPOLYMERIZATION OF MALEIC
ANHYDRIDE
Ashot Merijan, Rahway, N.J., assignor to General Aniline
& Film Corporation, New York, N.Y., a corporation
of Delaware
No Drawing. Filed Apr. 3, 1964, Ser. No. 357,277
3 Claims. (Cl. 260—78.4)

This invention relates to homopolymers of maleic anhydride and a process for their manufacutre and more particularly to homopolymers of maleic anhydride having molecular weights of 30,000 or above.

It is a well established concept in polymer chemistry that maleic anhydride cannot be homopolymerized to form maleic anhydride homopolymers because of the steric hindrance in the maleic anhydride monomer which is imposed by 1,2-disubstitution on the carbon to carbon double bond. However, a recent article in J. Poly. Sci., vol. I, pp. 1123–1136 (1963), which appeared after my invention reports that maleic anhydride can be homopolymerized by exposure to gamma radiation ($Co^{60}$) over extended periods of time. This publication reports that conversions in the range of from 0 to 35% can be obtained when massive doses of gamma radiations are applied to maleic anhydride or its solutions in solvents such as acetic anhydride. Acetic anhydride is assumed to have synergistic effects and to be responsible for higher conversions because 1,4-dioxane gives much lower conversions in homopolymerizations under comparable conditions. It is also reported that gamma radiation induced homopolymerizations of maleic anhydride in acetic anhydride at a weight ratio of 1:1 are not influenced by temperature, but that conversion increases occur with temperature increases when solvents are not present. This conclusion does not appear to be in accord with the experimental data taken from this publication and tabulated in Table I.

TABLE I.—RADIATION BY GAMMA RAYS

| Temperature, °C. | Intensity, Mrad./hr. | Time, Hr. | Total dose, Mrad. | Percent Conversion |
|---|---|---|---|---|
| 75 | 0.206 | 99.7 | 20.5 | 56.2 |
| 100 | 0.200 | 112.6 | 22.52 | 19.52 |
| 125 | 0.200 | 112.6 | 22.52 | 25.99 |

Analysis of these data indicate that decreases in the percent conversion of maleic anhydride to its homopolymer occur when reaction temperatures are increased. This publication reports that homopolymers of maleic anhydride obtained by gamma radiation polymerization were characterized by viscosity and molecular weight studies. One such homopolymer which had an intrinsic viscosity of 0.146 dl./g. in acetophenone is reported to have a molecular weight of 23,100.

This paper also reports that maleic anhydride can be homopolymerized by using free radical initiators such as dibenzoyl peroxide over extended periods of time. A 33.94% conversion of maleic anhydride to its homopolymer is reported to have been obtained with 5.0% dibenzoyl peroxide (based on the weight of maleic anhydride) at 60° C. for 48 hours in the absence of solvents. When acetic anhydride is used as a solvent at a weight ratio of 1:1, a 33.6% conversion of maleic anhydride to its homopolymer is obtained using the same dibenzoyl peroxide concentration and reaction conditions. The publication does not indicate if the percent conversion obtained in these 2 experiments with dibenzoyl peroxide is dependent on reaction temperature. Conversions of 15% by using ultraviolet radiation with 1% diacetyl peroxide in acetic anhydride at a weight ratio of 1:1 at 25° C. for 27 days are also reported. The effects of other types of free radical initiators such as lauroyl peroxide and $\alpha,\alpha'$-azobisisobutyronitrile, at concentrations of 1.0% and reaction temperatures of 60°–67° C. for 7 days are also reported. It is claimed that these initiators produce only miniscule amounts of homopolymers.

An object of this invention is to produce homopolymers of maleic anhydride having molecular weights of 30,000 or above. Another object is to provide a process for the homopolymerization of maleic anhydride which gives improved conversions over shorter reaction periods. These and other objects of this invention will become apparent as this description proceeds.

Objects of this invention are attained by my discovery that higher molecular weight homopolymers of maleic anhydride are obtained by exothermic homopolymerization at higher temperatures with dibenzoyl peroxide and other free radical types of polymerization initiators than are obtained by the methods known in the prior art. It is to be recalled that the highest percent conversions of maleic anhydride to its homopolymers with dibenzoyl peroxide as an initiator in the above publication are in the low 30's and that these conversions are obtained at reaction temperatures in the range of 60°–70° C. over extended periods of time. As best as can be determined from the teachings of the prior art, higher temperature homopolymerizations of maleic anhydride were not attempted with free radical type of initiators such as dibenzoyl peroxide.

I have discovered that when maleic anhydride is heated with small amounts of dibenzoyl peroxide to temperatures in the range of 85°–90° C. exothermic homopolymerization is initiated and the reaction temperature increases exothermically. When the reaction temperature increases exothermically to about 115° C., homopolymerization proceeds at a much faster rate. The maximum homopolymerization rates are attained when temperatures of about 150°–155° C. are reached. Generally, these temperatures are reached within 1 to 20 minutes after homopolymerization is initiated. If further additions of dibenzoyl peroxide are made at reaction temperatures of 100°–110° C., similar exothermic increases in temperature occur but these temperature increases are not as great as when homopolymerization is initiated at 85°–90° C. In one such homopolymerization of maleic anhydride where a total of 5% dibenzoyl peroxide (by wt.) is added in 5 equal increments at 110°–130° C., a conversion of 75% based on maleic anhydride is obtained over a reaction period of 3.5 hours. In practice of this invention, it may be desirable to limit the initial dibenzoyl peroxide addition to 2% (by wt.) or less to simplify control of the exothermic reaction, particularly the reaction temperature.

The effect of successive additions of peroxide or other free radical types of initiators on the homopolymerization process disclosed in this invention may be illustrated in the following manner. Generally, the first 1% (by wt.) addition of dibenzoyl peroxide at a threshold polymerization temperature in the range of 80° to 90° C. gives from 15 to 20% conversion of maleic anhydride to its homopolymer. A second 1% addition of peroxide increases the overall yield to about 35%, a third 1% addition to about 50%, a fourth 1% addition to about 60 to 65%, a fifth 1% addition to about 70 to 75% and a sixth 1% addition to about 80 to 82%. Usually, the successive peroxide additions are made at a predetermined time interval such as 30 minutes. The principal effect of the total amount of free radical initiator used in the polymerization appears to be increased yield. Higher yields are obtained with greater amounts of initiator. For most purposes in the practice of this invention, successive additions of about 1% (by wt.) of peroxide are preferred because control of polymerization conditions is simplified. It is also to be understood that the initiator may be added continuously during the polymerization rather than as successive additions.

Additions of higher percentages of initiators such as peroxides, e.g., in excess of 1% (by wt.) may be employed if provisions are made for control of polymerization conditions such as exothermic temperatures, viscosity of the polymerization mixture and other conditions encountered in the polymerization. When suitable provisions are made for the control of these conditions, all of the peroxide used in the polymerization may be added as a single addition over a short period of time if desired. Lower percentages than 1% may also be employed in the polymerization. It will be understood that use of an initial concentration of less than 1% (by wt.) will give a conversion of less than 15 to 20%. However, the use of concentrations of less than 1% initially or as successive increments does not preclude their use because the total quantity of peroxide actually determines the percent conversion, i.e., the total amount of peroxide employed determines the percent conversion rather than the particular quantity of peroxide chosen to be added incrementally.

One of the requirements of this invention is that the exothermic homopolymerization of maleic anhydride be initiated at a threshold polymerization temperature of at least 80° to 90° C. Such a threshold temperature is required to obtain homopolymers having molecular weights above 30,000. If molecular weights of less than 30,000 are desired, higher threshold temperatures may be employed. These temperatures may be in the range of 150° to 160° C. or as high as 180° to 190° C. depending on the molecular weight of the homopolymer desired.

It has also been found that if compounds such as succinic anhydride, benzophenone, benzaldehyde, nitrobenzene, dimethyl phthalate or phthalic anhydride are used in conjuncton with dibenzoyl peroxide the exothermic homopolymerization begins at lower temperatures than when benzoyl peroxide is used alone, but these combinations do not appear to produce higher conversions than when dibenzoyl peroxide is used alone. One possible explanation of this result is that these compounds may increase the initial decomposition rate of dibenzoyl peroxide.

A study of the effect of temperature on the percent conversion of maleic anhydride to its homopolymer shows that temperatures above 90° C. do not appear to have any appreciable effects. Homopolymerizations at temperatures of 90°–110° C. and at temperatures of 120°–130° C. using a total of 5% dibenzoyl peroxide both give 70–75% conversions. Although homopolymerizations at higher temperatures such as 140°–150° C. may be carried out readily because viscosity of the reaction mixture increases when solvents are not present, benzoyl peroxide additions are usually not as effective because most of the peroxide added to the mixture decomposes violently while floating on the surface of the viscous reaction mixture so that only a small part of the peroxide actually mixes with the reactants and aids in the polymerization.

Usually, homopolymers of maleic anhydride are isolated by precipitation of the homopolymers from the polymerization mixture by addition of solvents such as benzene or toluene. Homopolymer precipitates are then washed with hot washes of the same solvent and dried in a vacuum oven. Any solvent in which maleic anhydride is soluble and the homopolymer is insoluble is suitable for use in isolation of homopolymers. Homopolymers are insoluble in solvents such as hydrocarbons, chlorinated hydrocarbons, ethers or the like.

The maleic anhydride homopolymers disclosed in this invention have been characterized by infrared spectroscopy, ultraviolet spectroscopy, viscosity and molecular weight studies. Typical chemical properties have also been investigated. Infrared spectrum shows disappearance of the carbon to carbon double bond but retention of the anhydride system. Molecular weight studies in methyl ethyl ketone by the light scattering method indicates that the homopolymers of maleic anhydride obtained by this invention have molecular weights of 30,000 or above.

Homopolymers of maleic anhydride may also be analyzed by fractional precipitation. The polymer is dissolved in a small quantity of methyl ethyl ketone or acetone. This solution is transferred to a 2-liter beaker and stirred with a magnetic stirrer. Small quantities of toluene, benzene or ether are added with stirring at room temperature until a precipitate is formed. The precipitate is removed by filtration, washed with the solvent used in the precipitation and dried in a vacuum oven. The filtrate from the first precipitation is transferred to the 2-liter beaker, stirred and successive additions of the precipitating solvent are made to this filtrate until a second precipitate is obtained. This second precipitate is separated, washed and dried in the same manner as the first precipitate. A third, fourth and, if necessary, a fifth precipitation is carried out in the same manner so that most of the polymer originally dissolved in the methyl ethyl ketone or acetone is recovered in the form of fractional precipitates.

The following is an example of one such fractional precipitation: Poly(maleic anhydride) weighing 34 g. is dissolved in 125 ml. of methyl ethyl ketone, placed in a 2-liter beaker and stirred. Toluene is added in 10 ml. portions until precipitation occurs. The following results are obtained from a series of four fractional precipitations:

|  | Fraction | Weight of Fraction, g. |
| --- | --- | --- |
| Vol. of Toluene Added: | | |
| 370 ml | 1 | 7.22 |
| 440 ml | 2 | 8.55 |
| 730 ml | 3 | 9.22 |
| 1,380 ml | 4 | 1.22 |

Homopolymers of maleic anhydride may be reacted with diamines such as hexamethylenediamine, p-phenylenediamine, m-phenylenediamine to produce polyamides. These polyamides are light colored powders which do not show any signs of decomposition or physical change at temperatures in the range of 400° C. The polyamides are insoluble in aqueous alkaline solutions. Insolubility in alkaline solutions is not unexpected because cross-linking of the homopolymers with diamines has occurred.

One advantage of the present invention over the prior art is that the newly discovered conditions under which maleic anhydride can be homopolymerized exothermically by free radical initiators give higher conversions of polymers in much shorter periods of time in the presence or absence of solvents than could be obtained previously. Although dibenzoyl peroxide is one of the preferred initiators, other peroxides and free radical initiators have also been found to give improved conversions under the conditions disclosed in this invention. This is particularly advantageous as these initiators under these new reaction conditions give greatly improved yields where previous workers reported or claimed these initiators gave negligible or miniscule yields.

Another advantage of the present invention is that higher molecular weight homopolymers are obtained with these new polymerization conditions. Molecular weights in excess of 30,000 which are much greater than those previously reported are normally obtained even when the polymerization is carried out in the absence of solvents.

An additional advantage of the present invention is the improved color of the polymers. Homopolymers obtained at the higher temperatures under the conditions of this invention are much lighter in color than those obtained by the methods described in the prior art. The prior art reported that black polymers were obtained whereas the homopolymers obtained in the present invention at temperatures of from 140° to 160° C. are light yellow and those at 110° to 130° C. are very light brown in color.

Advantages and differences of the present invention over the prior art may be illustrated by homopolymerization of maleic anhydride with a total of 5.0% of dibenzoyl peroxide (by wt.) as the free radical initiator. The prior art reports a conversion of 39.9% after 48 hours at 60° C. in the absence of solvent and 33.6% after 48 hours at 70° C. with 5% dibenzoyl peroxide in an equal weight of acetic anhydride. Under the conditions of this invention, a 75% conversion is obtained within 3 to 3.5 hours in the absence of solvents by using 5.0% dibenzoyl peroxide by weight.

The following examples illustrate the products and process disclosed by this invention. These examples are only illustrative of this invention and are not regarded as limitative. It is to be understood that all parts, percent and proportions referred to herein and in the appended claims are by weight unless otherwise indicated. All references as to temperatures are in ° C. unless indicated otherwise.

Example 1

Distilled maleic anhydride, 200 g., and dibenzoyl peroxide, 2.0 g. (1.0% by weight based on maleic anhydride), are charged to a 500 ml. 4-necked flask equipped with stirrer, reflux condenser, thermometer, a gas inlet and a gas outlet so that homopolymerizations can be carried out in inert gas atmospheres by using inert gases such as nitrogen or the like. After charging the reactants, the system is flushed with nitrogen to displace all air and the charge is heated to 85° C. Heating is then stopped. The reaction temperature continues to rise and reaches a maximum temperature of 150° C. within 8 minutes. At this point, the reaction mixture is a dark solution. The reaction mixture is then allowed to cool to a temperature in the range of 110°–130° C. and maintained at a temperature within this range by heating or cooling if necessary. Four additional 1% (by wt.) dibenzoyl peroxide additions are made at half-hour intervals. The reaction temperature increases exothermically after each peroxide addition. After a total of 3.5 hours of reaction (1.5 hours after final peroxide addition) 250 ml. of toluene is added to precipitate the product. The product precipitates in the form of a brown solid lump. This lump is broken into a stirrable powdered mass by increasing agitation and heating. The mass is then separated from the toluene by transferring the mixture to a filter and removing the toluene by filtration. The filter cake is then reslurried in hot toluene; slurry transferred to a filter and sucked dry to remove the toluene. The resulting solid homopolymer is dried in a vacuum oven at 90°–100° C. The dried homopolymer is a light tan colored solid having a M.P. of 300° C. (320° decomp.). The homopolymer weighs 150 g. which represents a 75% conversion. The product is then fractionally precipitated from methyl ethyl ketone by addition of toluene. The second fraction obtained from fractional precipitation has a molecular weight of 81,000 by the light scattering method.

Example 2

Commercial maleic anhydride, 200 g., and dibenzoyl peroxide, 2.0 g. (1.0% by wt. based on maleic anhydride), are charged to the apparatus described in Example 1, and the system is flushed with nitrogen. The reactants are heated to 85° C. and heating is discontinued. The reaction temperature gradually increases exothermically to 150° C. After the reaction temperature reaches 150° C., the reaction mixture is cooled to 110°–130° C. and maintained in this temperature range by heating or cooling if necessary. Four additional 1% (by wt.) dibenzoyl peroxide additions are made at one-half hour intervals at temperatures within this range. The reaction mixture is then held 1.5 hours after the last peroxide addition. At this point, 250 ml. of hot toluene is added and the homopolymer precipitated in the form of a brown solid. The homopolymer is then pulverized by heating and stirring in hot toluene. The resulting slurry is then transferred to a filter and the toluene separated from the homopolymer by filtration. The filter cake is then reslurried in hot toluene with heating and the toluene separated from the homopolymer by filtration. The homopolymer then is dried in a vacuum oven at 80°–90° C. for 24 hours. A total of 144 g. of homopolymer representing a 72% conversion is obtained. The homopolymer has a M.P. of about 300° C. with decomposition. The product is then fractionally precipitated from methyl ethyl ketone by addition of toluene. The second fraction from the fractional precipitation has a molecular weight of 94,000 as determined by the light scattering method.

Example 3

Maleic anhydride, 200 g. and dibenzoyl peroxide, 2.0 g. (1% by wt. based on maleic anhydride), are charged to an apparatus of the type described in Example 1. The reactants are heated with stirring until the reaction temperature reaches 90° C. Heating is discontinued at 90° C. The reaction temperature immediately after discontinuing heating drops to 86° C. at which point a slight exothermic reaction is observed and the temperature starts rising slowly, but the temperature is maintained at 90°–110° C. by cooling or heating if necessary. Three additional 1% (by wt.) dibenzoyl peroxide additions are made at one-half hour intervals at temperatures in the range of 90°–110° C. A few minutes after the last benzoyl peroxide addition the reaction mixture becomes so viscous that it cannot be agitated. At this stage, 250 ml. of toluene is added and the homopolymer precipitates from the reaction mixture. After the homopolymer is filtered from toluene, it is reslurried twice in hot toluene and refiltered. The purified homopolymer is dried in a vacuum oven at 85° C. for 24 hours. The homopolymer is a light gray product which has a M.P. of 315° C. with decomposition. A total of 145 g. of homopolymer representing 72.5% conversion is obtained.

Example 4

Maleic anhydride, 200 g., and azobisisobutyronitrile, 2.0 g. (1.0% by wt. based on maleic anhydride), are charged to an apparatus of the type described in Example 1, and the system flushed with nitrogen. This mixture is then heated to 100° C. at which point heating is stopped. An exothermic reaction is observed at this point and the reaction temperature rises to 130° C. within 3 minutes. The reaction mixture is then maintained at a temperature in the range of 115°–130° C. and two additional 1% (by wt.) azobisisobutyronitrile additions are made at one-half hour intervals at temperatures in the range of 115°–130° C. After a total of one hour and 10 minutes reaction, or 10 minutes following the last catalyst addition, 250 ml. of hot toluene is added and a reddish powder is precipitated. This reddish powder which is the homopolymer is separated from the tuluene by filtration, reslurried twice in hot toluene and filtered after each reslurrying. The resulting homopolymer is then dried in a vacuum oven at 80° C. for 24 hours. This product weighs 26.0 g. (13% conversion) and shows no signs of decomposition at temperatures up to 250° C.

Example 5

Maleic anhydride, 200 g., phthalic anhydride, 2.0 g. (1.0% by wt. based on maleic anhydride), are charged to an apparatus of the type described in Example 1, and the system flushed with nitrogen. The reaction mixture is heated initially to 120° C. to dissolve the phthalic anhydride in the mixture and then cooled to 95° C. at which point dibenzoyl peroxide, 2.0 g. (1% by wt. based on maleic anhydride) is added. An exothermic reaction occurs immediately and the reaction temperature rises to 150° C. The reaction temperature is then allowed to drop slowly and within a half-hour a second addition of 1% peroxide (by wt.) and phthalic anhydride 1% (by wt.) is made at 110° C. A second exothermic reaction is noted and the temperature rises to 150° C. again. A third addition of peroxide and phthalic anhydride, 1% (by wt.) of each is made at the end of the second half-hour at a temperature of 110°–115° C. and after a reaction period of 1.5 hours, benzene, 250 ml., is added to precipitate the homopolymer. The precipitated homopolymer is a powdery product. It is collected on a filter and washed with hot benzene. The homopolymer is reslurried in benzene; the slurry heated to reflux and filtered to remove benzene. The purified homopolymer is then dried in a vacuum oven at 80°–90° C. for 24 hours. A total of 94.0 g. (47% conversion) of light tan colored homopolymer is obtained. It has an initial decomposition temperature of 280° C. Fractional precipitation of the homopolymer from methyl ethyl ketone by the addition of toluene gives a third fraction of homopolymer which has a molecular weight of 98,000 by the light scattering method.

Example 6

Maleic anhydride, 98.0 g., is dissolved in butyrolactone, 172.0 g., in an apparatus of the type described in Example 1. The system is then purged with nitrogen and di-t-butyl peroxide, 14.6 g., is added and the reaction mixture heated. When the reaction temperature reaches about 130° C., a rapid exothermic reaction occurs. Repeated exothermic cooling is required to maintain the reaction temperature within the range of 120°–130° C. After reaction for 21 hours at temperatures in the range of 120°–130° C., the solvent, butyrolactone and unreacted maleic anhydride are removed by vacuum distillation. A residue which is the crude product remains in the reaction flask. This crude produce is dissolved in ethyl acetate and precipitated by the addition of ethyl ether. The resulting slurry is filtered to remove the solvents. The filter cake is reslurried in hot toluene, separated from the slurry by filtration and dried in a vacuum oven at 80°–100° C. for 24 hours. A total of 60 g. (61% conversion) of product is obtained.

Maleic anhydride homopolymers produced by the process disclosed in this invention have a number of applications. These polymers may be used as cross-linking agents for polyvinyl alcohols or other polymers having hydroxyl groups as well as with polymers having amino groups. Such polymers include textiles such as cotton, silk, wool or the like. The homopolymers may also be used as cross-linking agents for epoxy resins or the like.

The homopolymers may be converted into half esters by partial esterification with alcohols and used in personal products such as hair grooming agents, color rinses, cosmetic lotions. The half esters may be used in the formulation of adhesives such as pressure sensitive adhesives, wood glues, metal adhesives, industrial finishes or the like. The homopolymers may also be converted into half amides by reaction with ammonia or appropriate amines. Such half amides may be used as oil additives for sludge dispersants, V.I. (viscosity improvers), rust inhibitors, fluocculants or the like. The homopolymers may also be converted into metal salts such as alkali salts and used as thickeners in oil field drilling fluids. As indicated above, the homopolymers may be reacted with diamines to form thermostable powders which do not show change after heating at 400° C. for extended periods of time. Homopolymers may also be used as polyelectrolytes for use in soil conditioning and soil stabilization as well as other applications employing polyelectrolytes. The homopolymers may be used as particle size regulators in emulsion and suspension polymerization. These homopolymers and their derivatives may be used as thickeners, dispersants, foam stabilizers and suspending agents in detergent formulations.

This invention has been disclosed with respect to certain preferred embodiments and various modifications. Variations thereof will become obvious to persons skilled in the art. It is to be understood that such modifications and variations are to be included within the spirit and scope of this invention.

What is claimed is:

1. A method of homopolymerizing maleic anhydride which comprises initiating homopolymerization of maleic anhydride with 1% by weight based on the weight of maleic anhydride of a free radical homopolymerization initiator selected from the group consisting of dibenzoyl peroxide and di-t-butyl peroxide at a homopolymerization threshold temperature of at least 80° C. followed by adding from 3 to 5 successive increments of 1% by weight of said initiator.

2. The method according to claim 1, wherein the polymerization is carried out in the absence of solvents.

3. The method according to claim 1, wherein the free radical polymerization initiator is dibenzoyl peroxide.

References Cited

UNITED STATES PATENTS

| 3,186,972 | 6/1965 | Lang et al. | 260—78.4 |
| 2,047,398 | 7/1936 | Voss et al. | 260—78.5 |
| 2,995,535 | 8/1961 | Gethins | 260—78.5 |

FOREIGN PATENTS

| 1,162,083 | 1/1964 | Germany. |

OTHER REFERENCES

J. P. S. Lang et al. April 1963, pp. 1123–1136, Journal of Polymer Science, vol. 55, issue 162, November, December 1961, pp. S–31 and S–32.

JAMES A. SEIDLECK, *Primary Examiner.*

JOSEPH L. SCHOFER, *Examiner.*

L. WOLF, *Assistant Examiner.*